March 12, 1935. E. CETRANO 1,994,270
TOOL FOR USE IN REPAIRING CHAINS
Filed June 13, 1934
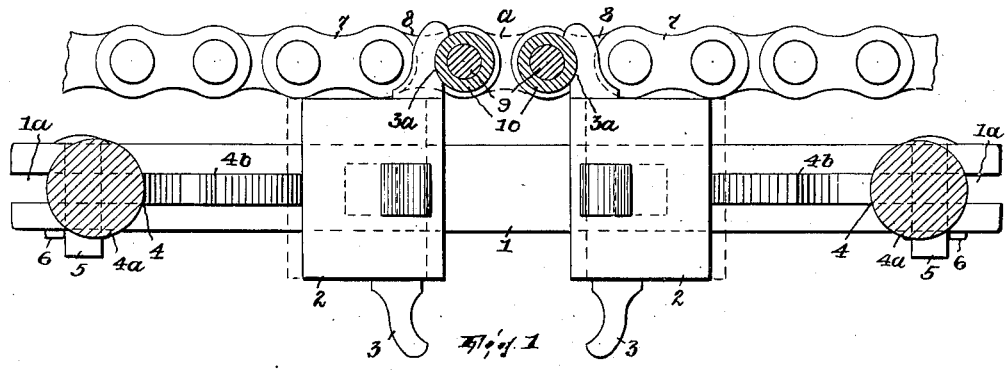
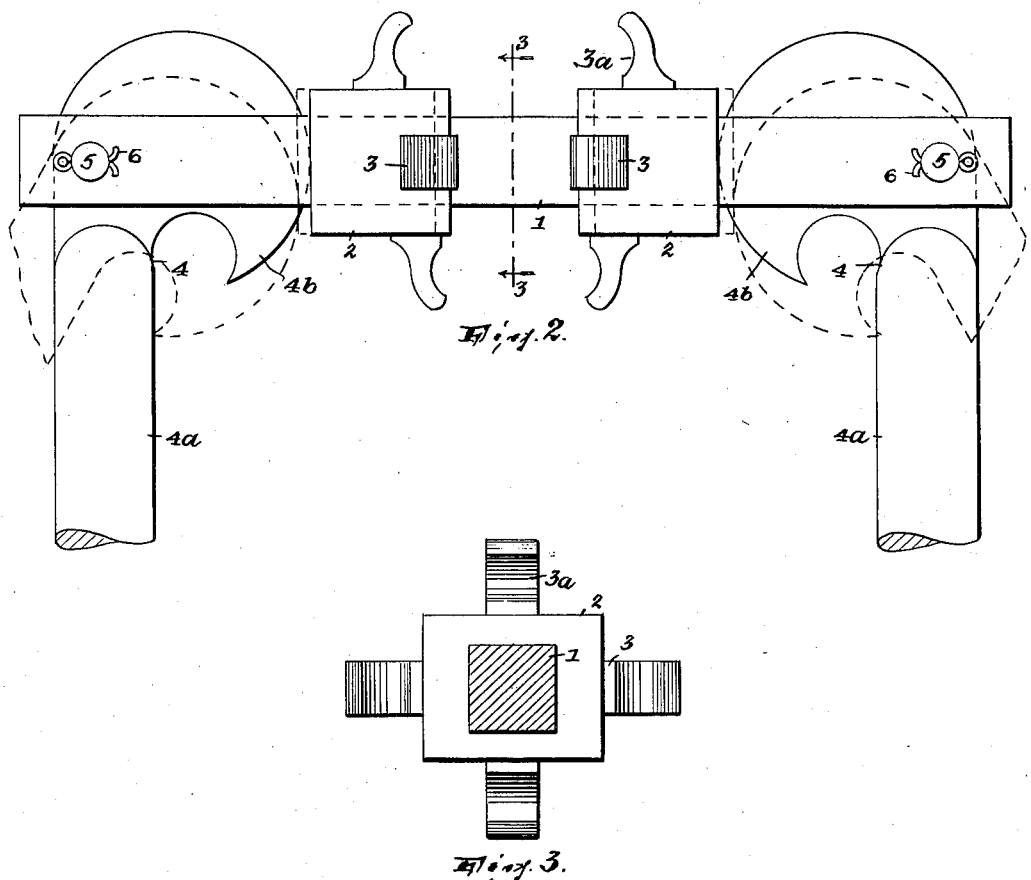
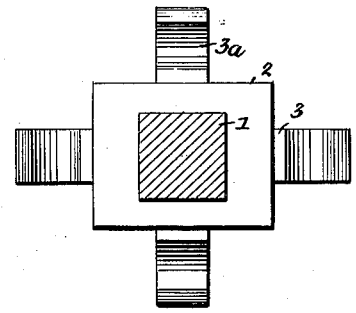
INVENTOR,
Eugene Cetrano,
BY
ATTORNEY Patented Mar. 12, 1935

1,994,270

UNITED STATES PATENT OFFICE 1,994,270

TOOL FOR USE IN REPAIRING CHAINS

Eugene Cetrano, Paterson, N. J., assignor of one-half to Louis Vacca, Paterson, N. J.

Application June 13, 1934, Serial No. 730,449

2 Claims. (Cl. 254—78)

In shops where the machines present include sprocket chains it is desirable to have available a tool whereby when a chain breaks or requires repairs the terminals of the chain (by which I mean the portions thereof on both sides of the break or other defect) may be readily drawn together and thereupon held in a definite relation to each other while the repair is being effected. So far as I am aware there exists no tool practically adapted for this purpose, wherefore much time has heretofore been wasted in repairing sprocket chains, frequently because each chain actually has to be removed from the machine in order to repair it. There is herein set forth a tool which is highly useful in repairing a chain while it remains in position on the machine; while it is shown and described herein as operative on sprocket chains it will be understood that it may be used in other analogous applications.

Fig. 1 shows the parted terminals of a sprocket-chain and said tool largely in elevation, portions of both, however, appearing in section;

Fig. 2 is a plan of the tool; and

Fig. 3 a section on line 3—3, Fig. 2.

1 is a bar which is square in cross-section and has each end provided with a longitudinal slot 1a and thereby forming a fork. On the bar are the block-shaped slides 2 forming what I term chain couplers, each having a square bore to fit the cross-section of the bar and also projections 3 extending laterally with respect to the bar in different radii (or, here, one from each of the four sides of the slide), the projections of each slide being set various distances from a given plane perpendicular to the bore of the slide; each projection has a concave seat 3a adjoining the opposite slide and giving it the form of a hook. In each fork is fulcrumed a handle-lever 4 whose long arm 4a affords the handle thereof and whose short arm 4b is a cam whose greatest radius forms a right angle with the long arm. The fulcrum for each handle-lever is a removable pin 5 held in place by the cotter pin 6; thereby the handle-lever itself is removable. In the movement of each handle-lever to the full-line position in Fig. 2 the cam is adapted to wipe against the adjoining slide and shift it inward, or toward the other slide.

A sprocket-chain of standard type is shown including outside link-sections 7, inside link-sections 8 alternating with link-sections 7, and cross-elements each comprising a pin 9 connecting link-sections of the two classes and a sleeve 10 revoluble on the pin. Assume (Fig. 1) that at point $a$ in the chain the two outside link-sections have to be replaced and that in the example they have been actually removed.

The operator, holding the tool by both handles proper and with the handles more or less in the dotted position, Fig. 2, enters two of the hooks 3 which project in the same direction into openings in the chain on both sides of the break at $a$ and then moves the two handle-levers together to draw the chain-terminals together so that the repair can be effected.

If the pair of hooks projecting in that direction from the slides which, with respect to adjacent parts of the machine or otherwise, is most convenient in thus operating the tool would not have the throw required for the particular chain (in point of size of its links) one or both handle-levers may be removed and the corresponding slide or slides removed and replaced on the bar turned to a position to bring another hook or hooks into active position.

The slides having been positioned on the bar as last indicated so as to be effective upon the particular chain, upon moving the handle-levers to the positions in which the greatest radii of the cams are between their fulcra and the slides the cams will stand in dead-center position, holding the slides from retraction under the pull of the chain. And by forming the hooks with concave seats 3a the engagement of the hooks with the cross-elements of the chain will be such that the tool can be left hanging from the chain and the operator's hands remain temporarily free for work on the chain in effecting the repair, especially if the cams are in the dead-center position shown in Fig. 2.

Whereas movability of both handle-levers is preferred because thereby the extent of movement for tightening the chain is divided between them it is not indispensable that both be movable. In its broad aspect my invention is a tool for the purpose described comprising a pair of chain couplers (as 2) one of which is slidable toward the other, means to support the latter coupler against displacement from the first coupler including a substantially straight bar (as 1) penetrated by and on which the first coupler is slidable and a handle (as either element 4) projecting laterally from the bar, and a hand-lever (as the other element 4) between which and the other coupler the first coupler is arranged and pivotally movable on the bar toward the handle to move the first coupler toward the other coupler.

Since the bar and each slide bore is square in cross-section each slide may be removed from the bar and upon turning it one, two or three quarters of a revolution it may be replaced in telescoping relation to the bar, and in any position which it is thus made to occupy it will be in effect splined to the bar.

Having thus fully described my invention what I claim is:

1. In combination, a guide having a handle, a slide telescoping and movable along the guide and removable therefrom at one end thereof, said slide being thereupon replaceable on the guide rotatively turned to a new position and said guide having means to spline the slide to the guide when the latter telescopes the former, and a handle-lever to move the slide along the guide removably fulcrumed in said end of the guide, said guide and slide each having in different radii from the guide projections offset from each other lengthwise of the guide and either of which is engageable with a chain-terminal.

2. A tool for the purpose described comprising a pair of chain couplers slidable toward each other, a substantially straight bar by which the couplers are penetrated and on which they are so slidable, and a pair of hand-levers arranged with the couplers between them and pivotally movable on the bar toward each other to move the couplers toward each other.

EUGENE CETRANO.